(12) United States Patent
Gade

(10) Patent No.: US 6,721,636 B1
(45) Date of Patent: Apr. 13, 2004

(54) METHOD AND SYSTEM FOR UNIFIED VEHICLE DYNAMICS CONTROL

(75) Inventor: Prasad Gade, Howell, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/453,120

(22) Filed: Jun. 3, 2003

(51) Int. Cl.[7] .................................................. G06F 7/00
(52) U.S. Cl. ............................................. 701/1; 701/36
(58) Field of Search ........................... 701/1, 3, 36, 41, 701/42, 51, 55, 56, 67, 68, 70, 71–79

(56) References Cited

U.S. PATENT DOCUMENTS

| | | | |
|---|---|---|---|
| 5,497,324 A | * | 3/1996 | Henry et al. ..................... 701/1 |
| 6,163,744 A | * | 12/2000 | Omuken et al. ................ 701/3 |
| 6,493,609 B2 | * | 12/2002 | Johnson .......................... 701/3 |

* cited by examiner

*Primary Examiner*—Richard M. Camby
(74) *Attorney, Agent, or Firm*—Michael D. Smith

(57) ABSTRACT

A system and method for unified vehicle dynamics control is described. A method for determining vehicle dynamics data, determining a vehicle dynamics reference model having at least one reference model parameter, and providing the reference model parameter to a closed-loop sliding mode control system is provided. A sliding mode control system substantially maintains the state of reference model parameters based on the vehicle dynamics reference model and the vehicle dynamics data. A method and system is directed to a computer readable medium containing a computer program comprising computer readable code for determining vehicle dynamics data, determining a vehicle dynamics reference model having at least one reference model parameter, and providing the reference model parameter to a closed-loop sliding mode control system.

17 Claims, 5 Drawing Sheets

METHOD AND SYSTEM FOR UNIFIED VEHICLE DYNAMICS CONTROL

TECHNICAL FIELD OF THE INVENTION

This invention relates to vehicle traction control systems, and more particularly to provisions for operating a unified traction control system.

BACKGROUND OF THE INVENTION

Many vehicles such as automobiles, trucks, buses, and motor homes, and motorcycles are equipped with a stability control system. Stability control systems may take several forms including braking, steering and lateral stability control systems. Generally, the purpose of a traction control system is to enhance the handling and ride performance of a vehicle under dynamic conditions. Discrete control systems for brakes and steering systems usually operate independently of each other utilizing open-loop control system architectures. Such systems have been implemented using a logic-based control methodology. A logic-based control system architecture is limited to systems such as single-input-single-output (SISO) implementations. While a logic-based system may be extended to control perhaps two discrete systems with adequate functionality, such systems may not be robust under conditions including dynamically changing variables having parametric or unstructured uncertainties, and additionally may interfere with each other through undesirable dynamic coupling. Therefore, it would be desirable to provide an improved system for controlling a traction control system that overcomes these and other disadvantages.

SUMMARY OF THE INVENTION

The present invention is directed to a system and method for unified vehicle dynamics control. The method of the invention describes determining vehicle dynamics data, determining a vehicle dynamics reference model having at least one reference model parameter, and providing the reference model parameter to a closed-loop sliding mode control system. A sliding mode control system substantially maintains the state of reference model parameters based on the vehicle dynamics reference model and the vehicle dynamics data.

In accordance with the invention, a method and system is directed to a computer readable medium containing a computer program comprising computer readable code for determining vehicle dynamics data, determining a vehicle dynamics reference model having at least one reference model parameter, and providing the reference model parameter to a closed-loop sliding mode control system. A sliding mode control system substantially maintains the state of reference model parameters based on the vehicle dynamics reference model and the vehicle dynamics data.

In accordance with another aspect of the invention, a vehicle including a unified system for vehicle dynamics control is provided comprising means for determining vehicle dynamics data, means for determining a vehicle dynamics reference model having at least one reference model parameter, a closed-loop sliding mode control system and means for providing the at least one reference model parameter to the sliding mode control system. The sliding mode control system substantially maintains the state of reference model parameters based on the vehicle dynamics reference model and the vehicle dynamics data.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
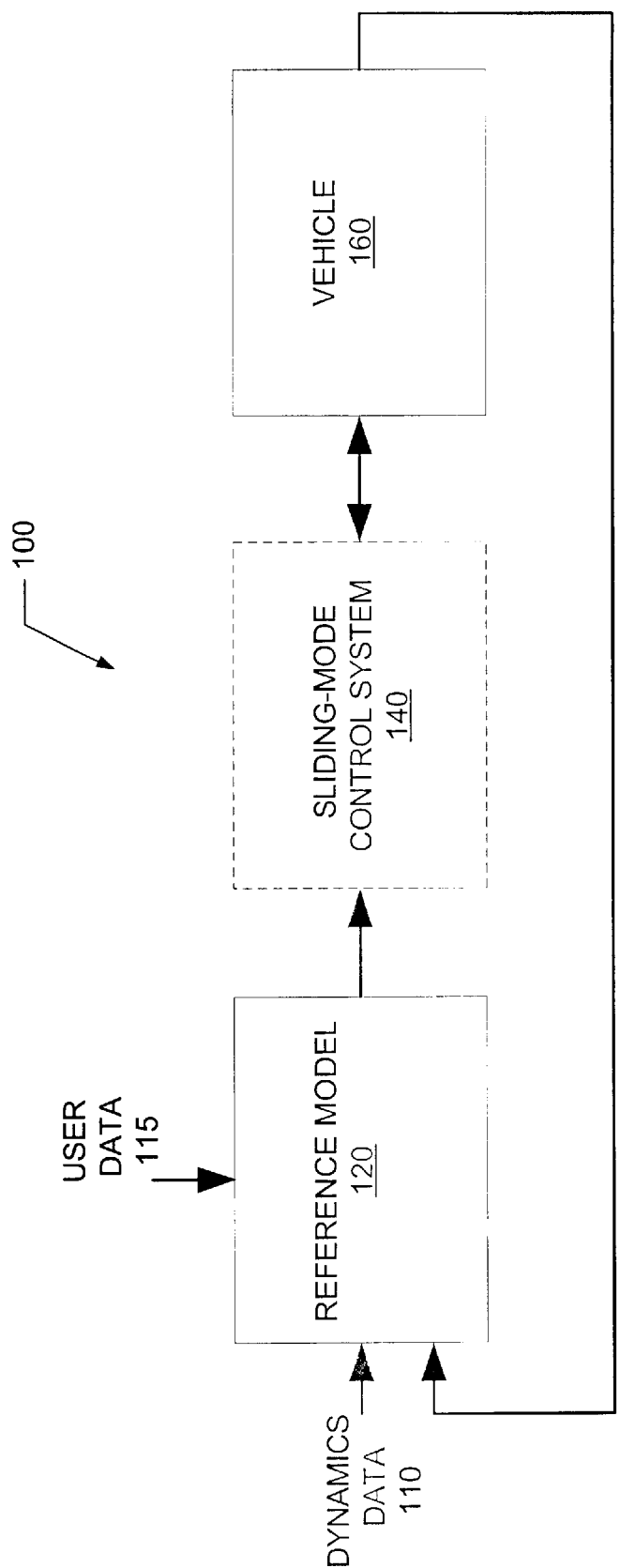
FIG. 1 shows a block diagram of a unified vehicle dynamics control system in accordance with an embodiment of the invention.

FIG. 1 shows a block diagram of a unified vehicle dynamics control system 100 in accordance with an embodiment of the invention. In FIG. 1, the unified vehicle dynamics control system 100 (hereinafter, control system) is shown comprising a reference model 120, a sliding mode control system 140, and a vehicle 160. The reference model 120 is shown having dynamics data input 110 and user input 115. The reference model 120 is shown coupled to the sliding mode control system 140 such that the reference model 120 may provide data to the sliding mode control system 140. The sliding mode control system 140 is shown coupled to the vehicle with a bidirectional coupling. The vehicle 160 is also shown coupled to the reference model 120 such that the vehicle 160 may provide data to the reference model 120, such as, for example dynamic data 110. Generally, control system 100 is a multi-channel system simultaneously controlling and effectively decoupling two or more vehicle systems, such as, for example, an active rear wheel steering system and an active roll-angle system. In one embodiment, control system 100 is a single channel control system, optimized for active roll-angle control.

Vehicle 160 dynamics are modeled with a linear three-degree-of-freedom vehicle model represented by the equations (1), (2) and (3) as follows:

$$I_{zzo}\ddot{\psi} + I_{xzso}\ddot{\phi} = N_{\dot{\psi}}\dot{\psi} + N_{V_y}V_y + N_{\phi}\phi + N_{\dot{\phi}}\dot{\phi} + N_{\delta_r}\delta_r + N_{hwa}\delta_{hwa}, \tag{1}$$

$$m_v\dot{V}_y + m_s h_s\ddot{\phi} = Y_{\dot{\psi}}\dot{\psi}V_y V_y + Y_{100}\phi + Y_{\dot{\phi}}\dot{\phi} + Y_{\delta_r}\delta_r + Y_{hwa}\delta_{hwa}, \text{ and,} \tag{2}$$

$$I_{xzso}\ddot{\psi} + m_s h_s(\dot{V}_y + V_x\dot{\psi}) + I_{xxso}[\$]\$\text{''}gf = m_s h_s g\phi - (k_f + k_r)\phi - (b_f + b_r)\dot{\phi} - T_\phi \tag{3}$$

where $\phi$ is the roll angle, and $\psi$ is yaw angle, and $\delta_{hwa}$ is the hand-wheel angle. A skilled practitioner will recognize the form and derivation of equations (1), (2) and (3) according to methods and practices known in the art.

The vehicle reference model 120 is a set of transfer functions that specifies the desired roll, yaw, hand-wheel angle and vehicle speed, for example. In one embodiment, vehicle speed (Vx), driver hand-wheel angle ($\delta_{hwa}$) and lateral acceleration (Ay) define the vehicle dynamics data input 110 to the reference model 120. User data 115 are driver-selected comfort metrics defined by predetermined state-variable sets that model ride and handling of the vehicle 160 under dynamic conditions and that meet specific desirable traits such as enhanced maneuverability, cornering or comfortable ride. Other data inputs (not shown) may be provided to the reference model 120. In one embodiment, the reference model is a look-up table having predetermined state-variable sets. In another embodiment, a look-up table defines an initial condition, to allow the control system 100 to initialize prior to the availability of vehicle dynamics data. In yet another embodiment, the reference model 120 comprises a look up table combined with dynamic components in the form of variable transfer functions.

The vehicle 160 is any vehicle to which the invention may be applied. Generally, vehicle 160 is a passenger vehicle having at least one traction control system such as, for example, active roll angle control, active rear wheel steering, and a brake-based traction control system. The vehicle 160 is a global abstraction for the sum of all discrete and interoperable vehicle components and systems that may be controlled by, or that may provide data to, control system 100. Each vehicle 160 system controlled by the control system 100 generates a reference model parameter that the control system 100 tracks through one or more state variables.

The sliding mode control system 140 is a non-linear control algorithm utilizing the state variables of the reference model 120 as constraints. A surface in phase plane, or a hyperplane in state space, is defined to be a linear combination of tracking errors. Ideal tracking by control system 100 occurs when the sliding surface is zero. The control system 100 is designed to drive the state of the system from any initial condition to the hyperplane and to ensure that the state of the system remains on the hyperplane despite any disturbances. A non-linear switching control law is required to attain the desired behavior, which may lead to chattering if implemented with large amplitudes. A modification to the control law is included in system 100 to minimize chattering. Additional modifications to the control law provide a trade-off between the rate at which the hyperplane is achieved and the amplitude of switching, but at the cost of non-ideal tracking response.

The sliding mode control system 140 employs tunable parameters through a state weighting matrix "Q," that is employed to design a state feedback matrix "Λ," for describing dynamics while in sliding motion (null space dynamics). A state variable Phi (Φ) describes the rate at which the hyperplane is attained (range space dynamics). A state variable Gamma (Γ) describes the dynamics of reference signals. A state variable Rho (ρ) describes amplitude of the non-linear switching control law. A state variable Delta (δ) describes the smoothness of the discontinuous signal.

An error function is employed to determine the state weighting matrix "Q" according to the equation:

$$J = \frac{1}{2} \int_{t_i}^{\infty} x^T(t) \underbrace{[diag(x_{i,max}^{-2})]}_{Q_i} x(t) dt. \quad (4)$$

Equations for the sliding mode control system 140 are derived from a second order differential equation of the form:

$$M\ddot{x} + C\dot{x} + Kx = u, \quad \text{where} \quad (5)$$

$$u = \underbrace{-B_2^{-1}[\Lambda x_2] - B_2^{-1}\Phi s}_{u_t} - \underbrace{B_2^{-1}\rho sgn(s)}_{u_{n t}}, \text{ and where} \quad (6)$$

$$sgn(s) = \frac{s}{|s| + \delta}. \quad (7)$$

State space equations derived from equations (4) and (5) are of the form:

$\dot{x}_1 = A_{11}x_1 + A_{12}x_2$, defining the null-space dynamics, and (8)

$\dot{x}_2 = A_{21}x_1 + A_{22}x_2 + B_2 u$, defining the range-space dynamics (9)

A time-varying surface is defined according to the equation:

$$s_p = \left(\Lambda + \frac{d}{dt}\right)^{n-1} e_p, \quad \text{where} \quad (10)$$

$e_p = x_p - r_p$, and p is the number of tracking variables, and (11)

,and, delete (12)

$$s = [\Lambda \quad I] \begin{Bmatrix} x_1 \\ x_2 \end{Bmatrix}. \quad (13)$$

For ideal sliding motion s=0. For an arbitrary function of the form:

$\Lambda x_1 + x_2$, it is then implied that (14)

$x_2 = -\Lambda x_1$, and therefore (15)

$\dot{x} = (A_{11} - \Lambda A_{12})x_1.$ (16)

A Lyapunov function may be defined according to the equation:

$V = \frac{1}{2} s^2$, a condition requires that (17)

$$\frac{dV}{dt} = s\dot{s} < 0 \quad \text{for asymptotic stability.} \quad (18)$$

Figure 2:
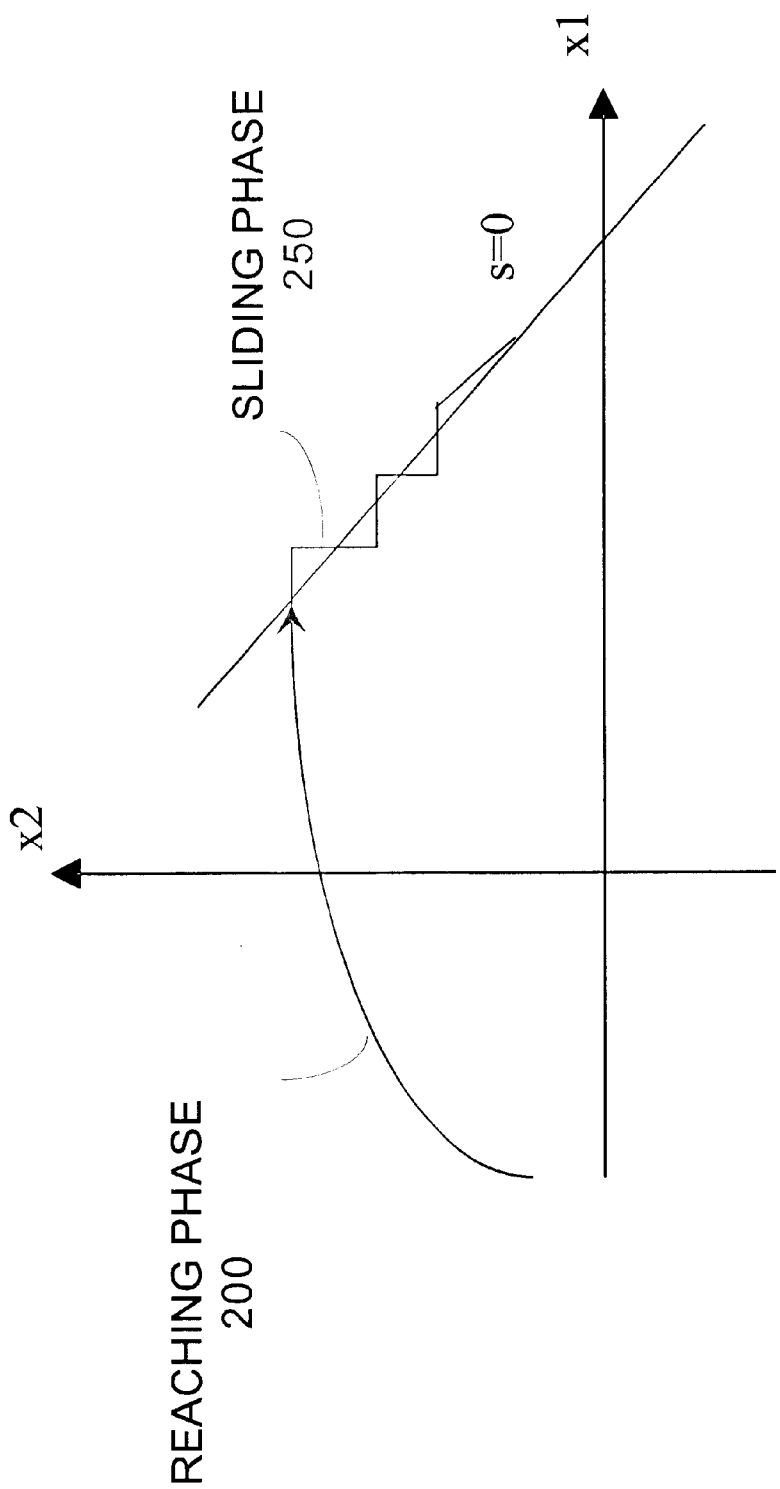
FIG. 2 illustrates the function of a sliding mode control system.

FIG. 2 illustrates the typical trade-off of switching amplitude versus control system 100 initialization response. A first state variable x1 is plotted against a second state variable x2. As the system approaches the hyperplane in the reaching phase 200, a non-linearity is evident in the sliding phase 250 until the error effectively goes to zero at s=0. Various state variable control systems will be known to the skilled practitioner, and further discussion of sliding mode control systems will be found in the literature.

Figure 3:
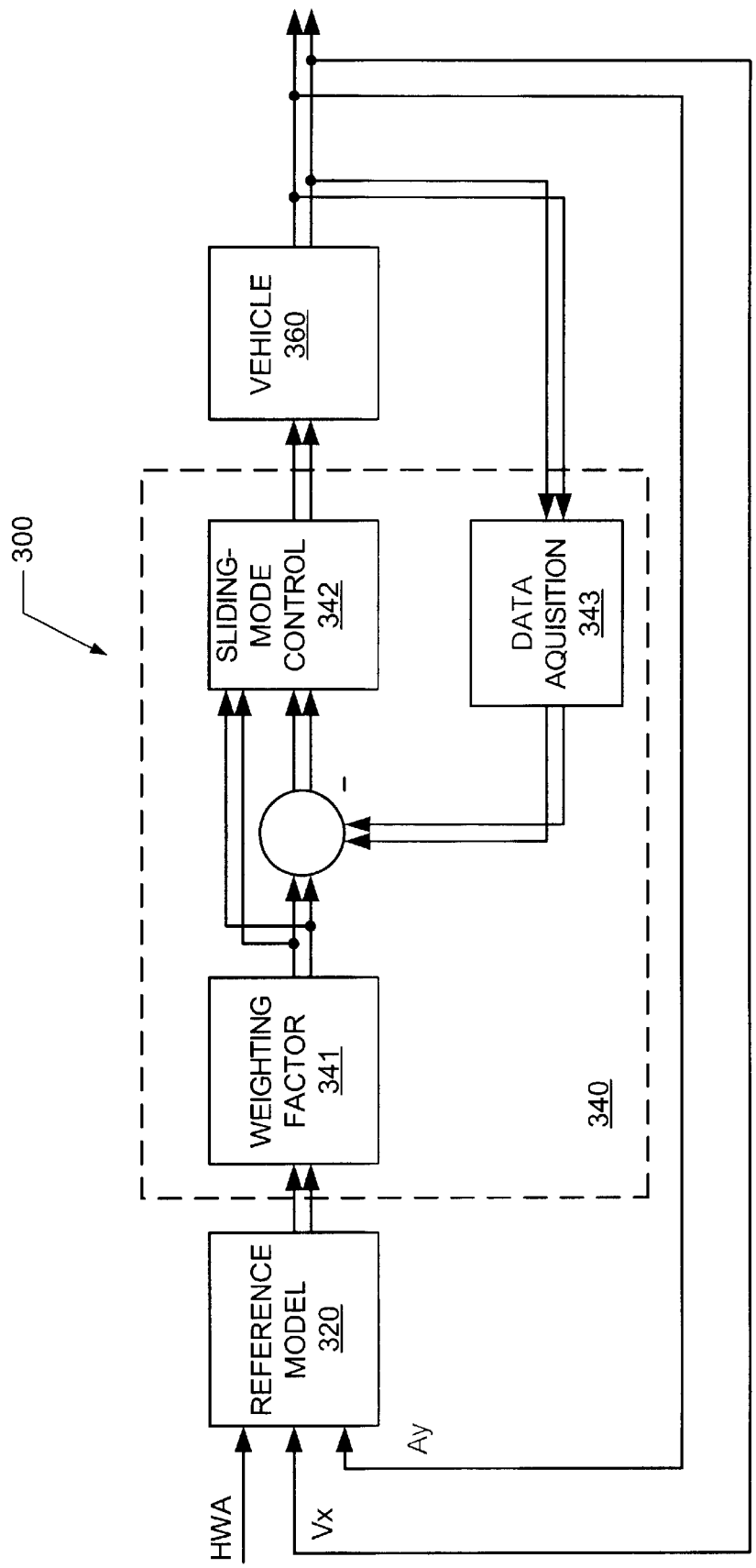
FIG. 3 shows a control diagram of the unified vehicle dynamics control system of FIG. 1 in accordance with an embodiment of the invention.

FIG. 3 shows a control system diagram of the unified vehicle dynamics control system of FIG. 1 in accordance with an embodiment of the invention. In FIG. 1, the unified control system 300 is shown comprising a vehicle dynamics reference model 320; a sliding mode control system 340 comprised of a weighting factor block 341 a sliding mode control law 342 and a data acquisition block 343; and, a vehicle 360. In FIG. 3, the reference model 320 is shown driving the weighting factor block 341 with a multi-channel state variable output. The weighting factor block is shown driving both the sliding mode control law block 342 and a summation node with a multi-channel state variable output.

The summation node is shown driving the sliding mode control law 342 with multi-channel state variable output. The sliding mode control law is shown driving the vehicle 360 with a multi-channel state variable output. The vehicle 360 is shown driving both a data acquisition block 343 and the reference model 320 with a multi-channel state variable output. A hand-wheel angle ($\delta_{hwa}$) data input is shown coupled to the reference model 320. In one embodiment (not shown), user data is input to the reference model 320 as in FIG. 1. In another embodiment, control system 300 is an algorithm or software module residing on a microcontroller or vehicle central command controller unit.

As described with reference to reference model 120 of FIG. 1, the reference model 320 is a state variable vehicle dynamics reference model. The reference model 320 generates reference model parameter outputs that drive the sliding mode control system 340, and effectively determine the vehicle 360 sub system parameters that will be controlled by the sliding mode control system 340.

The sliding mode control system 340 employs a weighting factor block 341. In one embodiment, the weighting factor block 341 is implemented as a state variable weighting matrix to optimize the reference model parameters provided from the vehicle dynamics reference model 320 based on factors such as user data and dynamics data such as vehicle speed and lateral acceleration. The weighting factor block 341 applies scaling factors to obtain the desired response characteristic from the sliding mode control system 340, since in practice, one vehicle reference model parameter of two or more is favored when operating a multi-input multi-output sliding mode control system 340.

The sliding mode control system 340 employs a data acquisition block 343. The data acquisition block 343 comprises an interface to a vehicle central processor, command controller or vehicle multiplex communication bus, to acquire feedback control data for a vehicle reference model parameter. In one embodiment, the data acquisition block 343 includes a processor. In another embodiment, the data acquisition device 343 is implemented as a software module residing on a microcontroller or vehicle command controller. In yet another embodiment, the data acquisition block 343 provides actual or estimated yaw rate and roll angle data based on available vehicle dynamics sensor data.

The sliding mode control law 342 is a modified non-linear switching control algorithm utilizing the state variables of the reference model 320 as constraints. Feedback from the data acquisition block 343 is subtracted from the vehicle reference model parameters at the summation node. The sliding mode control law 342 then compares the output of the weighting factor block 341 (the vehicle reference model parameters) with the output of the summation node (the linear combination of the tracking errors) and drives the state of the system from an initial condition to a hyperplane. The sliding mode control law block 342 then works to substantially maintain the state of the system on the hyperplane despite any uncertainties or disturbances within the limits of the system. A modification to the control law is included in sliding mode control law 342 to minimize chattering. Additional modifications to the sliding mode control law 342 provide a trade-off between the rate at which the hyperplane is achieved and the amplitude of switching at the cost of non-ideal tracking response.

As described with reference to vehicle 160 of FIG. 1, vehicle 360 is any vehicle to which the invention may be applied. Generally, vehicle 360 is a passenger vehicle having at least one traction control system such as, for example, active roll angle control, active rear wheel steering, and a brake-based traction control system. The vehicle 360 is a global abstraction for the sum of all discrete and interoperable vehicle components and systems that may be controlled by, or that may provide data to, sliding mode control system 340. Each vehicle 360 system controlled by the sliding mode control system 340 generates a vehicle reference model parameter that the sliding mode control system 340 tracks through one or more state variables.

Figure 4:
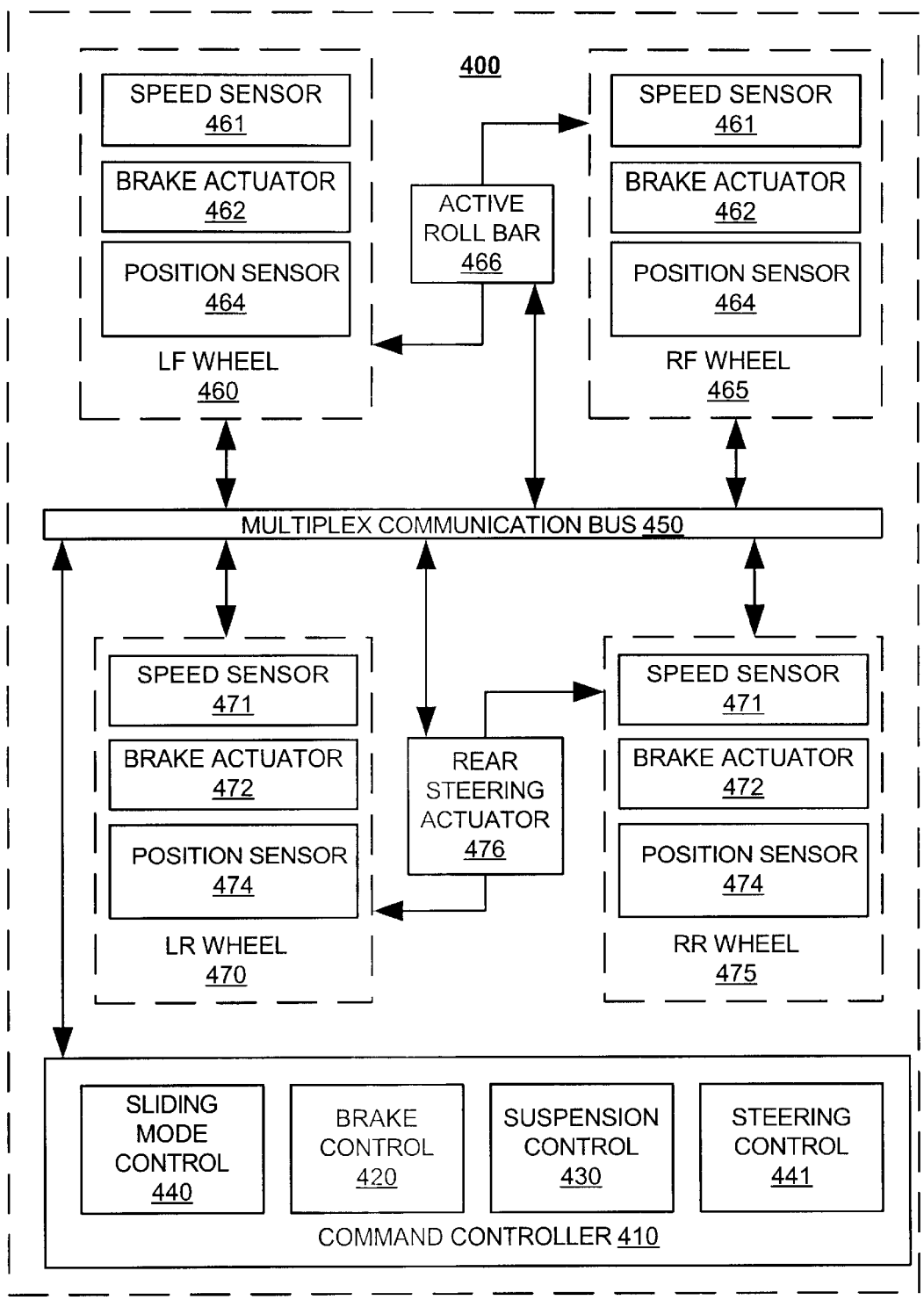
FIG. 4 shows a block diagram of a centralized unified vehicle dynamics control system in accordance with an embodiment of the invention.

FIG. 4 shows a block diagram of a centralized unified vehicle dynamics control system 400 in accordance with an embodiment of the invention. In FIG. 4, the centralized unified control system 400 is comprised of a command controller block 410, a right front wheel block 460, a left front wheel block 465 a left rear wheel block 470, a right rear wheel block 475, an active roll bar 466, a steering actuator 476 and a multiplex communication bus 450. The command controller block 410 is further shown comprising a brake control 420 a sliding mode control 440, steering control 441, and suspension control 430. The left front wheel 460 and the right front wheel 465 are each shown further comprising a speed sensor 461, a brake actuator 462, and a relative positional sensor 464. The left rear wheel 470 and the right rear wheel 471 are each shown further comprising a speed sensor 471, a brake actuator 472, an active roll bar, 473, and a steering actuator 474. The active roll bar 466 is shown operably coupled between the left front wheel 460 and the right front wheel 465. The steering actuator 476 is shown operable coupled between the left rear wheel 470 and the right rear wheel 475. The multiplex communication bus 450 is shown operably coupled to the left front wheel 460, the right front wheel 465, the left rear wheel 470, the right rear wheel 475, the active roll bar 466, the steering actuator, and the command controller 410.

In an embodiment, the command controller 410 is a microcontroller or processor, or a combination of microcontrollers and microprocessors, having memory and capable of executing stored computer programs. In one embodiment, the brake control 420, the sliding mode control 440, the steering control 441, and the suspension control 430 are software modules that reside in non-volatile memory of the command controller 410. In another embodiment, the command controller 410 is itself a software module resident on a vehicle central processing unit (not shown). In yet another embodiment, the command controller is hosted by one of the controls such as, for example, steering control 441. The brake control 420 is any brake controller such as an anti-lock brake controller or a brake-by-wire controller. The steering control 441 is any steering controller such as a front wheel steer-by-wire controller or a rear wheel steering actuator controller. The suspension control 430 is any suspension controller such as an active suspension ride controller. The sliding mode control 440 is a sliding mode control system 340 as described with reference to FIG. 3.

The centralized unified control system 400 incorporates a multiplex communication bus 450 to communicate signals between components. The multiplex communication bus 450 is a bidirectional data bus configured to allow multiple connected devices to exchange data. Devices coupled to the multiplex communication bus 450 have unique addresses that allow them to be identified and accessed by other devices. Methods and systems for implementing a multiplex communication bus 450 will be known by those skilled in the art, and will not be further elaborated.

The right front wheel 460 is illustrative of components that are usually common to both front wheels. However, in some implementations a speed sensor 461 or a relative position 464 may be included on only one of the front wheels. The speed sensor 461 is any vehicle velocity sensor device such as an electromechanical, magnetic or optical pickup. The relative position sensor is placed between the sprung and unsprung mass of a vehicle to detect relative positional information such as deflection. In one embodiment, the relative position sensor 464 and the speed sensor 461 are a combined unit. In another embodiment, speed data and/or acceleration are provided from a GPS transceiver, or a radio or optical Doppler system. The brake actuator 462 is any brake actuator device, and in one embodiment is an electro-hydraulic actuator enabled for communication with a brake-by-wire system or a central brake control 420. The active roll bar 463 is any active vehicle roll stabilizing device. In an embodiment, the active roll bar 463 is coupled between the front wheels and employs a hydraulic actuator at one end. In one embodiment, a lateral acceleration sensor (not shown) is positioned at the vehicle center-of-mass for detecting lateral acceleration and generating sensor data.

The rear wheel 470 is illustrative of components that are usually common to both rear wheels of a four wheel vehicle. However, in some implementations a speed sensor 471 or a relative position sensor 474 may be included on only one of the rear wheels. The speed sensor 471 is any vehicle velocity sensor device such as an electromechanical, magnetic or optical pickup. In one embodiment the relative position sensor 474 and the speed sensor 471 are a combined unit. The brake actuator 472 is any brake actuator device, and in one implementation is an electro-hydraulic actuator enabled for communication with a brake-by-wire system or a central brake control 420. The steering actuator 476 is any active rear wheel steering device, an in one implementation is an electro-hydraulic actuator operated by a steering control such as steering control 441. In an embodiment, the steering actuator 476 is coupled between the front wheels, and may have a hydraulic actuator at one or both wheel-ends of the actuator assembly. In one embodiment, a steering control 441 resides at one rear wheel with the steering actuator assembly, and executes commands to the steering actuator.

In one embodiment, the command controller commands the brake control 420, sliding mode control 440 steering control 441 and suspension control 430. The sliding mode control 440 is configured to communicate with the other controls and to obtain vehicle dynamics data, such as speed and lateral acceleration from sensors and other systems through the multiplex communication bus. In one embodiment, the sliding mode control 440 is enabled to usurp the command controller 410 and provide simultaneous sliding mode control for the brake control 420, the steering control 441, and the suspension control 430. Additional systems not illustrated may be added to the sliding mode control state variables to allow sliding mode control of multiple vehicle systems to unify the vehicle dynamics control. In one embodiment (not shown), the unified vehicle dynamics control system 400 is distributed rather than centralized, with the controls such as brake control 420, sliding mode control 440 steering control 441 and suspension control 430 residing in sensors and actuators such as speed sensors 461 and 471 brake actuators 462 and 472 and the like. Component controls in a distributed unified dynamics control system 400, communicate command signals and data through the vehicle multiplex communication bus 250.

In the following process description, some steps may be combined, omitted or occur simultaneously or in a different order without departing from the invention.

Figure 5:
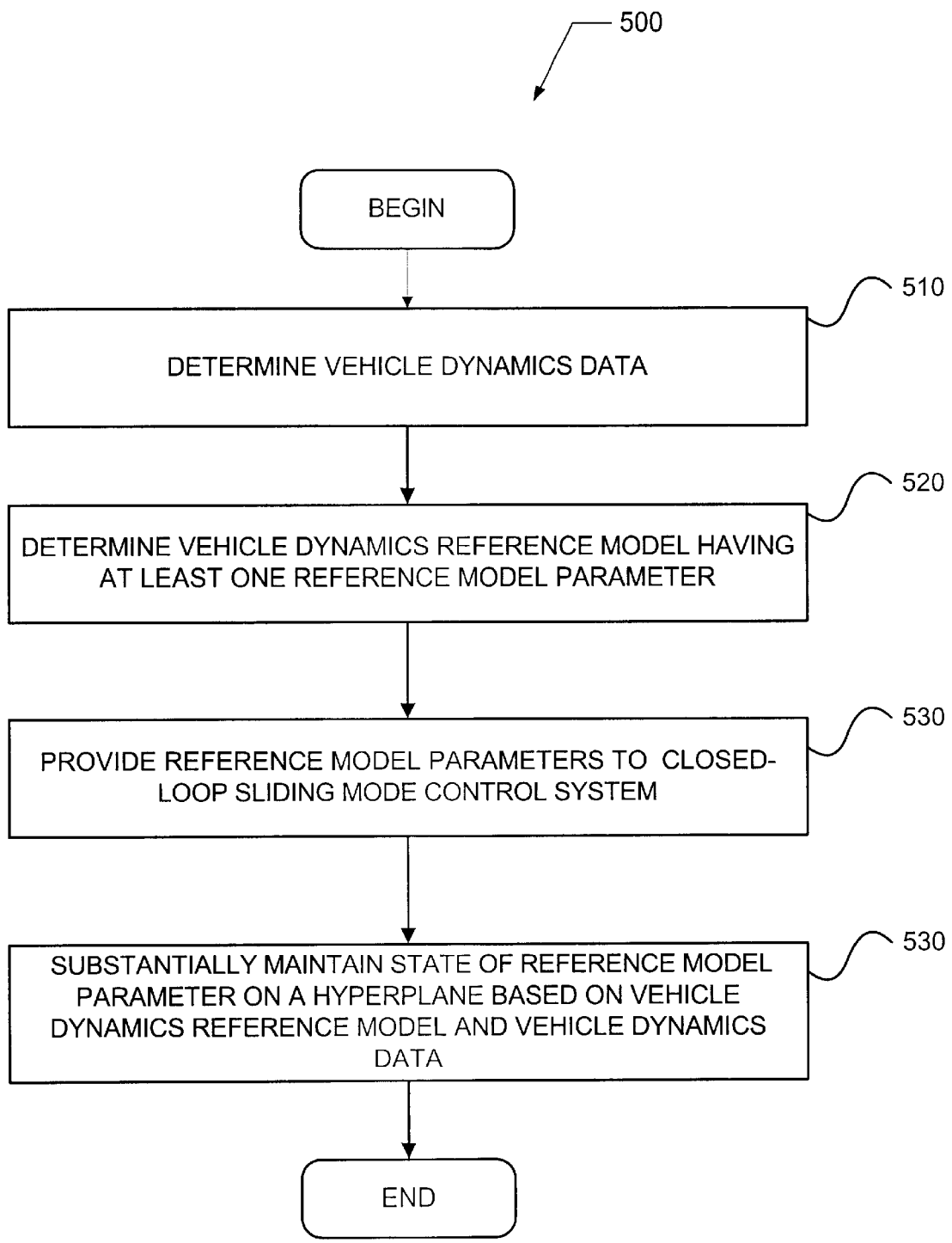
FIG. 5 is a flow diagram of a method for unified vehicle dynamics control in accordance with an embodiment of the invention.

FIG. 5 is a flow diagram of a method for unified vehicle dynamics control in accordance with an embodiment of the invention. Process 500 begins in step 510. Generally, process 500 is implemented with a unified vehicle dynamics control system such as discussed in FIGS. 1,3 and 4.

In step 510, vehicle dynamics data are determined. The vehicle dynamics may be any data representing the instantaneous dynamics of the vehicle. In one embodiment, dynamics data comprises vehicle velocity data, lateral acceleration data, hand wheel angle data and optionally, user selection data. The vehicle dynamics data may be received at any time prior to or after the initiation of the sliding mode control system 340. The vehicle dynamics data may be determined continuously or in discrete intervals with a device such as a sample-and-hold. Generally, the vehicle dynamics data are the output of devices such as a speed sensor, a lateral acceleration sensor, and a steering wheel angle position sensor.

In step 520, a vehicle dynamics reference model having at least one reference model parameter is determined. The vehicle dynamics reference model is a linear three-degree-of-freedom vehicle model utilizing state variables to define the dynamics of a vehicle. The reference model defines the vehicle dynamics based on variables such as yaw rate, side-slip angle, roll angle and roll rate. In one embodiment, the reference model is a look-up table having predetermined state-variable sets, and the reference model is configured for a signal channel system. The vehicle dynamics reference model may be determined at any time after vehicle dynamics data are determined. The vehicle dynamics data are automatically provided to the vehicle dynamics reference model as a function of a unified vehicle dynamics control system architecture. The vehicle dynamics reference model is determined to provide reference model parameters which may include one or more state variables, to a sliding mode control system. Generally, determining the vehicle reference model parameters includes performing calculations and operations on the vehicle dynamics data to determine coefficients for predetermined mathematical vehicle dynamics modeling structures.

In step 530, the vehicle reference model parameters are provided to a closed-loop sliding mode control system. The vehicle reference model parameters represent the dynamic vehicle systems for which sliding mode control is sought. The reference model parameters include state variable matrices describing states of the vehicle dynamics. The reference model parameters may be provided to the sliding mode control system at any time after the parameters are determined. The parameters may be provided continuously or periodically depending on the system configuration and user settings. In one embodiment, a user command resets the system, and new vehicle reference model parameters are determined based on the user command.

In step 540, the unified sliding mode control system initializes and substantially maintains the state of at least one reference model parameter on a hyperplane based on the vehicle dynamics reference model and the vehicle dynamics data. The sliding mode control system initializes a hyperplane representing the control system error at any time after the vehicle reference model parameters are received and a feedback error signal has also been received and compared. After initialization, the feedback control system substantially maintains the state of reference model parameters on the hyperplane until the vehicle reference model parameters change. In one embodiment, the unified sliding mode control system reinitializes on a periodic basis. In another embodiment, the system reinitializes when an error occurs that exceeds the unified sliding mode control system tolerance. The domain of influence for the unified sliding mode controller is generally within linear handling to a moderately non-linear region of less than 0.6 g.

The scope of the invention is indicated in the appended claims. We intend that all changes or modifications within the meaning and range of equivalents are embraced by the claims.

I claim:

1. A method for unified vehicle dynamics control comprising:

determining vehicle dynamics data;

determining a vehicle dynamics reference model having at least one reference model parameter;

providing the at least one reference model parameter to a closed-loop sliding mode control system; and wherein the sliding mode control system initializes and substantially maintains the state of at least one reference model parameter on a hyperplane based on the vehicle dynamics reference model and the vehicle dynamics data.

2. The method of claim 1 wherein determining a vehicle dynamics reference model comprises:

receiving user selection data; and configuring the vehicle dynamics reference model based on the user selection data and the vehicle dynamics data.

3. The method of claim 1 further comprising:

applying a weighting factor to a first reference model parameter and an at least second reference model parameter prior to providing the first reference model parameter and at least second reference model parameter to the sliding-mode control system.

4. The method of claim 3 wherein the vehicle dynamics reference model is a state-variable matrix comprising the first reference model parameter and the at least second reference model parameter.

5. The method of claim 1 wherein the at least one reference model parameter is selected from the group consisting of yaw rate, roll angle, side slip angle and roll rate.

6. The method of claim 1 wherein the sliding mode control system is a software module configured on a central command controller.

7. The method of claim 1 wherein the sliding mode control system is a decentralized control system linked through a vehicle communication bus.

8. The method of claim 1 wherein the vehicle dynamics data is the output of a device selected from the group consisting of a speed sensor, a lateral acceleration sensor, and a steering wheel angle position sensor.

9. A computer readable medium containing a computer program comprising:

computer readable code for determining vehicle dynamics data;

computer readable code for determining a vehicle dynamics reference model having at least one reference model parameter;

computer readable code for providing the at least one reference model parameter to a closed-loop sliding mode control system; and wherein the sliding mode control system initializes and substantially maintains the state of at least one reference model parameter on a hyperplane based on the vehicle dynamics reference model and the vehicle dynamics data.

10. The computer readable code of claim 9 wherein determining a vehicle dynamics reference model comprises:

configuring the vehicle dynamics reference model based on received user selection data and the vehicle dynamics data.

11. The computer readable medium of claim 9 further comprising:

computer readable code for applying a weighting factor to a first reference model parameter and an at least second reference model parameter prior to providing the first reference model parameter and at least second reference model parameter to the sliding-mode control system.

12. The computer readable code of claim 11 wherein the vehicle dynamics reference model is a state-variable matrix comprising the first reference model parameter and the at least second reference model parameter.

13. The computer readable medium of claim 9 wherein the at least one reference model parameter is selected from the group consisting of yaw rate, roll angle, side slip angle and roll rate.

14. The computer readable medium of claim 9 wherein the sliding mode control system is a software module configured on a central command controller.

15. The computer readable of claim 9 wherein the sliding mode control system is a decentralized control system linked through a vehicle communication bus.

16. The computer readable medium of claim 9 wherein the vehicle dynamics data is the output of a device selected from the group consisting of a speed sensor, a lateral acceleration sensor, and a steering wheel angle position sensor.

17. A vehicle including a system for unified vehicle dynamics control comprising:

means for determining vehicle dynamics data;

means for determining a vehicle dynamics reference model having at least one reference model parameter;

a closed-loop sliding mode control system;

means for providing the at least one reference model parameter to the sliding mode control system; and wherein the sliding mode control system initializes and substantially maintains the state of at least one reference model parameter on a hyperplane based on the vehicle dynamics reference model and the vehicle dynamics data.

* * * * *